United States Patent
Chen et al.

(10) Patent No.: US 12,167,268 B2
(45) Date of Patent: Dec. 10, 2024

(54) CONFIGURATION OF MULTIPLE MEASUREMENT GAPS FOR A UE

(71) Applicant: Apple Inc., Cupertino, CA (US)

(72) Inventors: Xiang Chen, Campbell, CA (US); Dawei Zhang, Saratoga, CA (US); Huaning Niu, San Jose, CA (US); Jie Cui, San Jose, CA (US); Manasa Raghavan, Sunnyvale, CA (US); Qiming Li, Beijing (CN); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/753,854

(22) PCT Filed: Apr. 1, 2021

(86) PCT No.: PCT/CN2021/084960
§ 371 (c)(1),
(2) Date: Mar. 16, 2022

(87) PCT Pub. No.: WO2022/205319
PCT Pub. Date: Oct. 6, 2022

(65) Prior Publication Data
US 2024/0073724 A1 Feb. 29, 2024

(51) Int. Cl.
*H04W 24/10* (2009.01)
*H04W 24/08* (2009.01)

(52) U.S. Cl.
CPC .......... *H04W 24/10* (2013.01); *H04W 24/08* (2013.01)

(58) Field of Classification Search
CPC ......... H04W 72/0446; H04W 36/0058; H04W 36/0088; H04W 36/0016; H04W 72/542;
(Continued)

(56) References Cited

U.S. PATENT DOCUMENTS

| 8,351,336 B2* | 1/2013 | Cai | ...................... H04W 74/002 370/252 |
| 8,369,209 B2* | 2/2013 | Zhang | ................... H04W 74/08 370/216 |

(Continued)

FOREIGN PATENT DOCUMENTS

WO   2019/162513   8/2019

OTHER PUBLICATIONS

Apple, "Discussion on multiple concurrent and independent MG patterns", 3GPP TSG-RAN4 Meeting #98-e, R4-2100222, Jan. 15, 2021, 5 sheets.

(Continued)

*Primary Examiner* — Jung Liu
(74) *Attorney, Agent, or Firm* — Fay Kaplun & Marcin, LLP (57) ABSTRACT

A user equipment (UE) is configured to perform measurements during two or more measurement gaps (MGs). The UE receives a MG configuration, wherein the MG configuration includes multiple MGs and MG conflict resolution information, determines whether a conflict exists between two or more of the MGs, selects at least one of the two or more MGs that have the conflict based on the MG conflict resolution information and performs signal measurements during the selected at least one of the two or more MGs that have the conflict.

18 Claims, 4 Drawing Sheets

(58) Field of Classification Search
CPC ........... H04W 72/569; H04W 72/1268; H04W 4/023; H04W 24/10; H04W 64/00; G01S 5/0205; G01S 5/10
See application file for complete search history.

(56) References Cited

U.S. PATENT DOCUMENTS

| | | | | |
|---|---|---|---|---|
| 11,743,782 | B2* | 8/2023 | Zetterberg | H04W 36/0061 455/436 |
| 11,818,769 | B2* | 11/2023 | Centonza | H04L 5/0053 |
| 2011/0116364 | A1* | 5/2011 | Zhang | H04W 74/08 370/216 |
| 2012/0264449 | A1* | 10/2012 | Kazmi | G01S 5/011 455/456.1 |
| 2013/0130687 | A1* | 5/2013 | Kumar Reddy | H04W 36/08 455/67.11 |
| 2014/0146697 | A1* | 5/2014 | Kim | H04B 7/0413 370/252 |
| 2017/0339595 | A1* | 11/2017 | Siomina | H04W 4/023 |
| 2018/0084448 | A1* | 3/2018 | Yang | H04L 5/003 |
| 2019/0222478 | A1* | 7/2019 | Yi | H04W 24/08 |
| 2019/0349797 | A1* | 11/2019 | Lin | H04W 24/10 |
| 2019/0373496 | A1* | 12/2019 | Cui | H04W 24/10 |
| 2020/0107337 | A1* | 4/2020 | Lin | H04L 1/0026 |
| 2021/0014751 | A1* | 1/2021 | Callender | H04W 72/0446 |
| 2021/0014752 | A1 | 1/2021 | Axmon et al. | |
| 2021/0227413 | A1* | 7/2021 | Yang | H04W 36/0069 |
| 2021/0289537 | A1* | 9/2021 | Qin | H04W 72/23 |
| 2021/0345323 | A1* | 11/2021 | Axmon | H04W 72/12 |
| 2022/0078813 | A1* | 3/2022 | Miao | H04W 36/0088 |
| 2022/0264593 | A1* | 8/2022 | Wang | H04W 72/542 |
| 2022/0417995 | A1* | 12/2022 | Lei | H04B 17/345 |
| 2023/0164735 | A1* | 5/2023 | Si | H04L 5/0091 455/456.1 |
| 2023/0209519 | A1* | 6/2023 | Li | H04W 72/0453 370/329 |
| 2023/0319946 | A1* | 10/2023 | Wang | H04W 76/27 370/329 |

OTHER PUBLICATIONS

Intel Corporation, "Discussion on multiple and independent concurrent measurement gaps in NR", 3GPP TSG-RAN4 Meeting #98-e, R4-2101270, Jan. 15, 2021, 7 sheets.

Qualcomm Incorporated, "On requirements for multiple concurrent and independent MG patterns", 3GPP TSG-RAN4 Meeting #98-e, R4-2102297, Jan. 16, 2021, 3 sheets.

* cited by examiner

CONFIGURATION OF MULTIPLE MEASUREMENT GAPS FOR A UE

BACKGROUND

In 5G new radio (NR) wireless communications, the 5G NR network may configure user equipment (UE) with one or more measurement gaps during which the UE performs measurements on one or more reference signals. As those skilled in the art will understand, during the measurement gaps, the UE will use the measurement gaps to measure reference signals from intra-frequency and/or inter-frequency neighbor cells or cells from another radio access technology (RAT).

SUMMARY

Some exemplary embodiments are related to a processor of a user equipment (UE) configured to perform operations. The operations include receiving a measurement gap (MG) configuration, wherein the MG configuration includes multiple MGs and MG conflict resolution information, determining whether a conflict exists between two or more of the MGs, selecting at least one of the two or more MGs that have the conflict based on the MG conflict resolution information and performing signal measurements during the selected at least one of the two or more MGs that have the conflict.

Other exemplary embodiments are related to a processor of a base station configured to perform operations. The operations include determining a measurement gap (MG) configuration for a user equipment (UE), the MG configuration comprising multiple MGs and MG conflict resolution information, wherein the MG conflict resolution information comprises information for the UE to resolve a conflict between two or more of the multiple MGs and transmitting the MG configuration to the UE.

DETAILED DESCRIPTION

The exemplary embodiments may be further understood with reference to the following description and the related appended drawings, wherein like elements are provided with the same reference numerals. The exemplary embodiments relate to a user equipment (UE) receiving a measurement gap (MG) configuration and performing signal measurements based on the MG configuration.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component.

In addition, the exemplary embodiments are described with regard to a 5G New Radio (NR) network. However, reference to a 5G NR network is merely provided for illustrative purposes. The exemplary embodiments may be utilized with any network that implements the functionalities described herein.

5G NR may operate on two different frequency ranges, e.g., Frequency Range 1 (FR1) and Frequency Range 2 (FR2). Releases 15 and 16 of 5G NR support two different types of MG, a per-frequency range (per-FR) MG or a per-UE MG. A (per-FR) MG means that the UE can support two different measurement gaps for the two frequency ranges, e.g., an MG1 for FR1 and an MG2 for the FR2) A per-UE MG means that the UE supports only one measurement gap for both frequency ranges, e.g., an MG1 for FR1 and FR2. However, even if a UE supports per-FR MG, only one MG pattern can be configured for each FR.

Release 17 adds support for multiple concurrent and independent MG patterns. Thus, a Release 17 UE that supports per-FR MG may be configured with multiple MGs on one FR and different multiple MGs on another FR, e.g., MG1 and MG2 on FR1 and MG3 and MG4 on FR2. A Release 17 UE that supports per-UE MG may be configured with multiple MGs on one FR and the same multiple MGs on another FR, e.g., MG1 and MG2 on both FR1 and FR2. However, there are at least two issues that arises when a UE is configured with multiple concurrent and/or independent MG patterns. The first issue is how to handle partially or fully overlapping MGs. A second issue is that two MGs may not overlap, but may be scheduled so close in time that the UE does not have enough time to process the measurements from the first MG prior to performing the measurements for the second MG. The concept of of "too close in time" may be UE dependent as it may depend on the specific capabilities of the UE such as the processing power of the UE. Thus, in some exemplary embodiments, it may be a UE implementation as to how close MGs are to be considered too close in time. However, in other exemplary embodiments, the actual time difference between two MGs that are too close in time may be defined by standard or may be defined by the network on which a UE is operating.

According to the exemplary embodiments, a next generation NodeB (gNB) of a 5G NR network may configure a UE with multiple MGs and further configures how the UE should handle a scenario in which MGs overlap or are too close. The further configuration may include a default MG and/or a sharing factor to apply to the multiple MGs.

Figure 1:
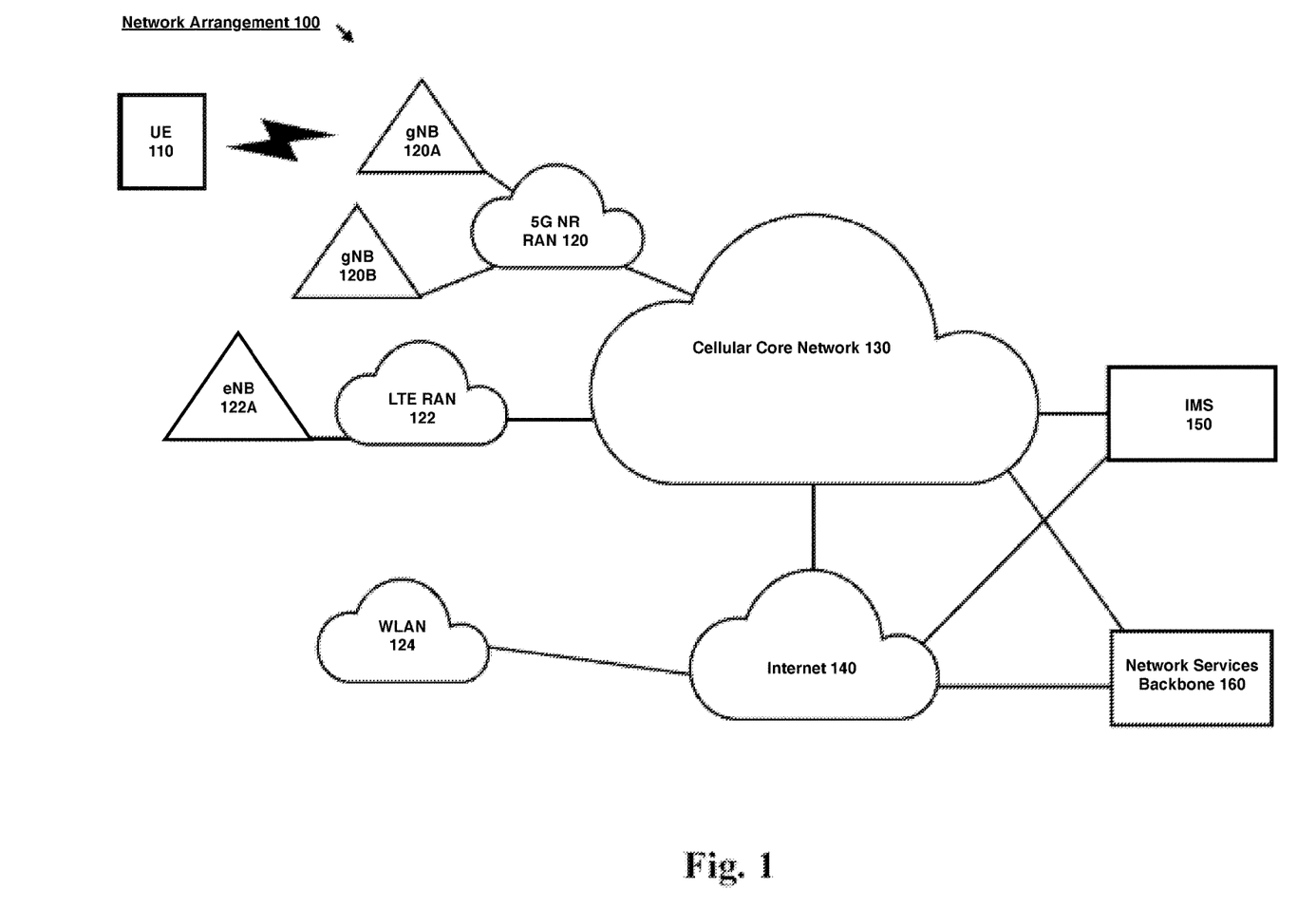
FIG. 1 shows an exemplary network arrangement according to various exemplary embodiments.

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. The gNBs 120A and 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UE. During operation, the UE 110 may be within range of a plurality of gNBs. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
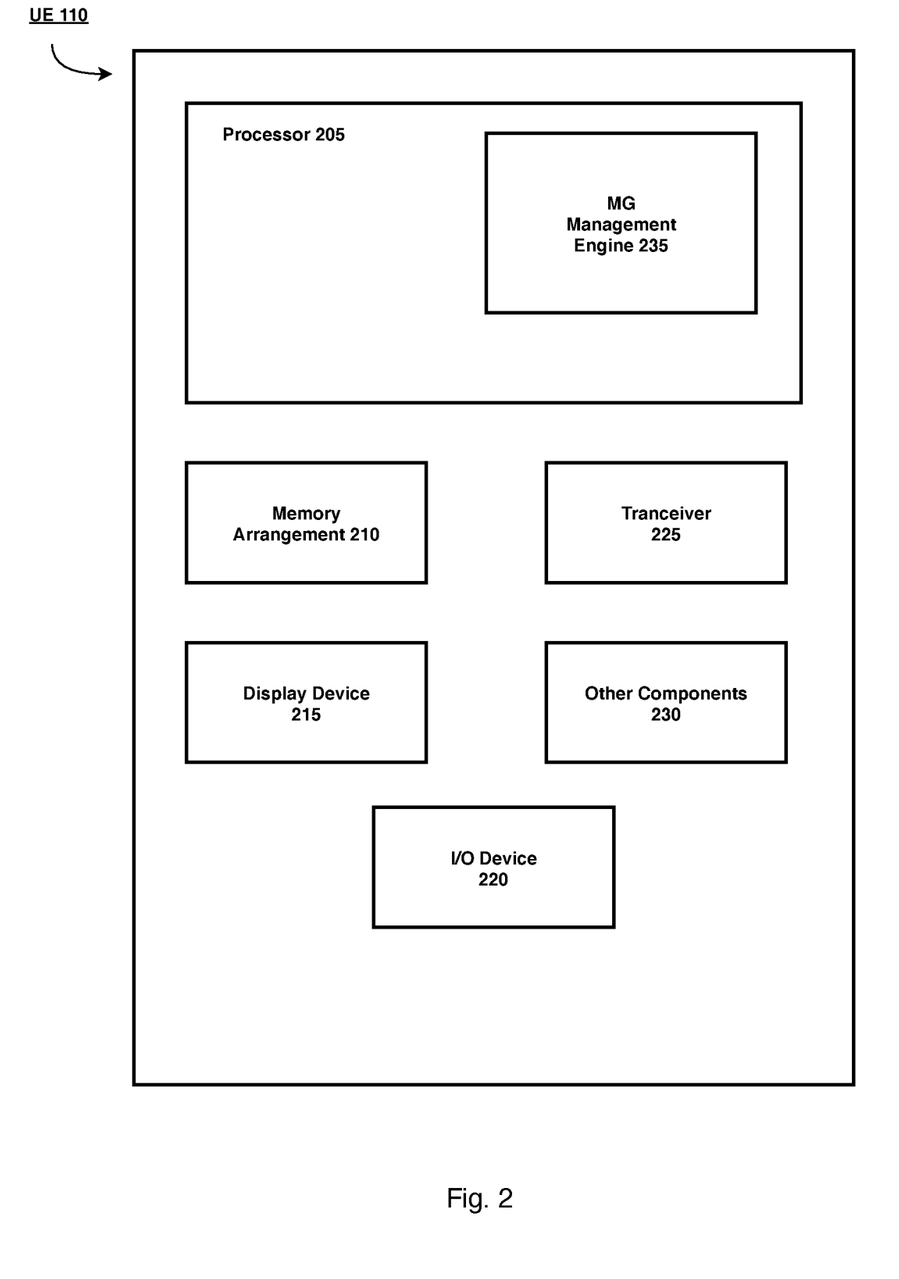
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include an MG management engine 235. The MG management engine 235 may perform various operations related to receiving an MG configuration including multiple configured MGs, MG conflict resolution and performing signal measurements during the MGs based on the MG configuration.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
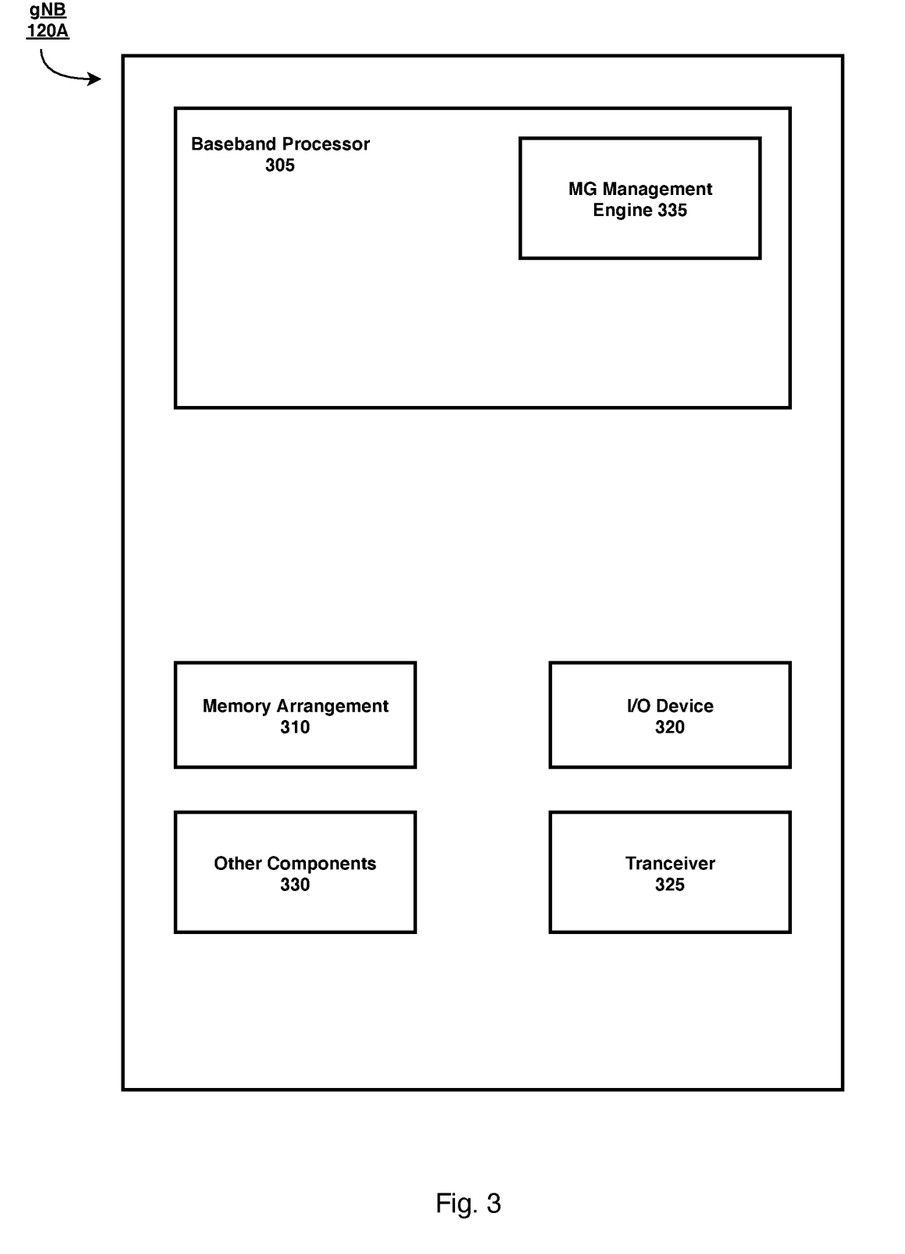
FIG. 3 shows an exemplary base station according to various exemplary embodiments.

FIG. 3 shows an exemplary network cell, in this case gNB 120A, according to various exemplary embodiments. The gNB 120A may represent any access node of the 5G NR network through which the UEs 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include an MG management engine 335 for performing operations including configuring MGs for the UE 110 and configuring an MG conflict resolution for when the UE 110 determines that two or more MGs overlap or are too close in time. Examples of this process will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4:
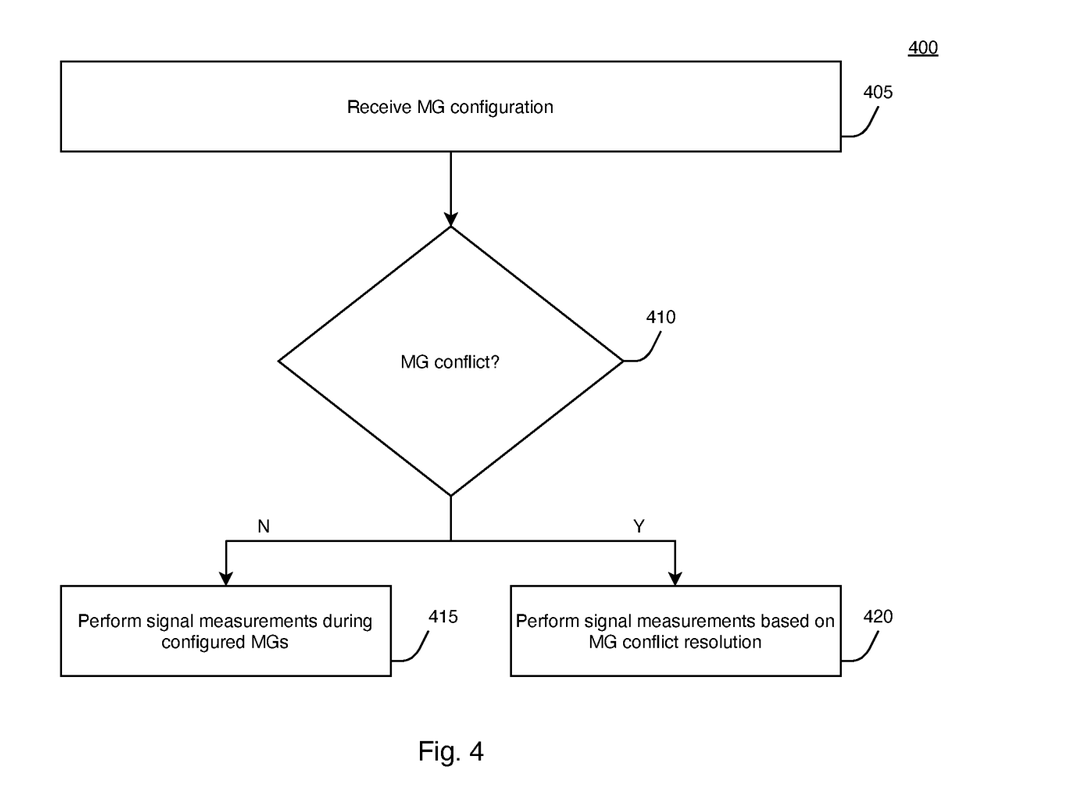
FIG. 4 shows a method of configuring multiple measurement gaps (MGs) according to various exemplary embodiments.

FIG. 4 shows a method 400 of configuring multiple measurement gaps (MGs) according to various exemplary embodiments. At 405, the UE 110 receives an MG configuration from the gNB 120A (or 120B). Typically, the MG configuration is transmitted via Radio Resource Control (RRC) signaling between the gNB 120A and the UE 110. The MG configuration includes one or more MGs configured for the UE 110 to perform measurements on reference signals from neighbor cells and/or cells from a different RAT, e.g., synchronization signal block (SSB), channel state information reference signal (CSI-RS), positioning reference signal (PRS), etc. As described above, Release 17 UEs may support per-FR MGs and/or per-UE MGs that include multiple concurrent and/or independent MG patterns. Throughout this description, it may be considered that the exemplary embodiments may be applied to the per-FR MG or per-UE MG configuration for Release 17 or any subsequent release that includes per-FR MGs and/or per-UE MGs that include multiple concurrent and/or independent MG patterns. In some exemplary embodiments, the MG configuration may further include an MG conflict resolution which the UE 110 is configured to use if the UE 110 determines that two or more MGs partially or fully overlap or are too close in time to one another as was described above.

In some exemplary embodiments, the MG conflict resolution includes an indication of which of the multiple configured MGs is a default MG. For example, if the gNB 120A configures the UE 110 with a first MG and a second MG, the MG configuration may include an indication that the first MG is the default MG. When the UE 110 determines that the first MG partially or fully overlaps with the second MG, the UE 110 will prioritize the first MG over the second MG. That is, the UE will not perform the signal measurements during the second MG. Similarly, if the UE 110 determines that there will not be enough processing time after the first MG and before the beginning of the second MG, the UE 110 will prioritize the first MG. The default MG may be indicated on a per UE basis (one default MG per UE) or on an FR basis (one default MG for each FR with which a UE is configured).

The decision as to which MG is the default MG may be based on various factors such as, for example, the resource signal(s) type to be measured during the MG (e.g., SSB, CSI-RS, PRS, etc.), MG patterns (e.g., MG length (MGL), MG repetition period (MGRP)), and/or a UE capability or type (e.g., reduced capability UE, minimum required processing time after MG, etc.). To provide an example, if the UE 110 is executing an application that is heavily dependent on location, the network may prioritize one or more MGs that are used to measure PRS, e.g., define these one or more MGs as the default MG. From this example, those skilled in the art will understand that there may be many scenarios that can be envisioned where certain measurements have a priority and the MGs that would include these measurements can be defined as the default MGs.

In some exemplary embodiments, the default MG may be dynamically changed to another configured MG (e.g., from the first MG to the second MG). As described above, the network may use any criteria to determine the default MG. Thus, a change in circumstance of the UE, e.g., a new application being executed, a new network slice being used, a change in mobility, a change in location, etc. may trigger the network to reevaluate the configured default MG. The default MG may be changed by, for example, providing an indication of the new default MG in a medium access control (MAC) control element (CE). In another example, the default MG may be changed by providing an indication of the new default MG in a downlink control information (DCI) transmission. In a further example, the default MG may alternatively be changed by providing an indication of the new default MG in a RRC transmission.

In some exemplary embodiments, the default MG may be changed based on a timer. For example, the gNB 120A may provide the UE 110 with the initial MG configuration (e.g., the MG conflict information) that may define a default MG (e.g., MG1) and a period for a timer. When the timer expires, the default MG may be changed to another configured MG (e.g., MG2). In further exemplary embodiments, the timer may then be reset and when the timer next expires the default MG may be changed again to another configured MG (e.g., the first default MG or another MG). In some exemplary embodiments, the period for the timer may be determined by the network (e.g., the gNB) based on any factor including the examples provided above for selecting the default MG. In other exemplary embodiments, the period for the timer may be defined by standard (e.g., 3GPP TS 38.331). The defined period may be discrete values or may be a range of values. When the defined period is a range of values, the network may have the option of selecting any value within the range and configuring the UE with the selected value.

In some exemplary embodiments, the MG conflict resolution includes a sharing factor (SF) for each configured MG. For example, if the gNB 120A configures the UE 110 with a first MG and a second MG, the MG configuration may include a sharing factor of 0.8 (80%) for the first MG and 0.2 (20%) for the second MG. As such, if the UE 110 determines that a conflict between the first and second MGs occurs, as described above, the UE 110 will resolve the conflict in favor of the first MG in four out of five conflicts (e.g., the UE will prioritize the first MG and perform the measurements associated with the first MG). Whereas the second MG will only be prioritized in one out of five conflicts.

Those skilled in the art will understand that the four out five conflict resolution is not required to be a linear decision, e.g., the first four of five resolved in the favor of the first MG. The UE 110 may randomly assign priority to an MG when a conflict arises and then evaluate whether the priority assignment satisfies the SF assigned by the network. If the priority assignment violates the SF, e.g., the second MG was assigned priority more than once within a predefined window, the UE 110 may change the priority to the MG that does not violate the SF (e.g., priority is changed to the first MG). Again, this is just one example of allocating priority to MGs based on a SF. Those skilled in the art will understand that other manners of selecting a MG based on the SF may be used in conjunction with the exemplary embodiments.

The SF may be indicated on a per UE basis (one set of SFs per UE) or on an FR basis (one set of SFs for each FR with which a UE is configured). Similar to the selection of the default MG as described above, the network may assign the SF based on various factors such as, for example, the resource signal(s) type to be measured during the MG (e.g., SSB, CSI-RS, PRS, etc.), MG patterns (e.g., MGL, MGRP), and/or a UE capability or type (e.g., reduced capability UE, minimum required processing time after MG, etc.), etc.

In some exemplary embodiments, the SF may be dynamically changed to a different SF. For example, the SF may be changed by providing an indication of the new SF in a MAC CE, by providing an indication of the new SF in a DCI transmission, by providing an indication of the new SF in an RRC transmission, etc.

Returning to FIG. 400, at 410, the UE 110 determines whether an MG conflict exists, e.g., overlapping MGs or MGs too close in time. If there is no conflict, in 415, the UE 110 performs the signal measurements during the configured MGs in the normal manner. On the other hand, if a conflict exists, in 420, the UE 110 performs the signal measurements for the conflict occasion based on the MG conflict resolution information in the MG configuration as discussed above, e.g., based on the default MG or the SF defined for the MGs. Those skilled in the art will understand that the method 400, e.g., the operations 410-420, will continue for the MGs as long as the MG configuration is valid.

Examples

In a first example, a user equipment having a transceiver configured to communicate with a network and a processor communicatively coupled to the transceiver and configured to perform operations is provided. The operations include receiving a measurement gap (MG) configuration, wherein the MG configuration includes multiple MGs and MG conflict resolution information, determining whether a conflict exists between two or more of the MGs, selecting at least one of the two or more MGs that have the conflict based on the MG conflict resolution information and performing signal measurements during the selected at least one of the two or more MGs that have the conflict.

In a second example, the UE of the first example, wherein the conflict comprises one of (i) the two or more MGs partially or fully overlap, or (ii) a time period between the two or more MGs is less than a processing time period required to process measurements from one of the MGs.

In a third example, the UE of the first example, wherein the multiple MGs are configured on a per frequency range (FR) basis for FRs with which the UE is configured.

In a fourth example, the UE of the first example, wherein the MG conflict resolution information includes an indication of which of the multiple MGs is a default MG, and wherein the selecting comprises selecting the default MG.

In a fifth example, the UE of the fourth example, wherein the default MG is indicated for each of multiple FRs with which the UE is configured.

In a sixth example, the UE of the fourth example, wherein the operations further comprise receiving updated MG conflict resolution information comprising a change to the default MG, wherein selecting the at least one of the two or more MGs that have the conflict is based on the updated MG conflict resolution information.

In a seventh example, the UE of the sixth example, wherein the updated MG conflict resolution information is received via one of a medium access control (MAC) control element (CE), a downlink control information (DCI) transmission, or a radio resource control (RRC) transmission.

In an eighth example, the UE of the fourth example, wherein the operations further comprise executing a timer, when the timer expires, updating the default MG from a first one of the multiple MGs to a second one of the multiple MGs, wherein a period for the timer is one of (i) signaled to the UE as part of the MG conflict resolution information or (ii) defined by standard.

In a ninth example, the UE of the first example, wherein the MG conflict resolution information includes multiple sharing factors (SFs) corresponding to the multiple MGs, and wherein the selecting is based on one or more of the SFs.

In a tenth example, the UE of the ninth example, wherein the multiple SFs are indicated for each of multiple FRs with which the UE is configured.

In an eleventh example, the UE of the ninth example, wherein the operations further comprise receiving updated MG conflict resolution information comprising a change to at least one of the SFs, wherein the updated MG conflict resolution information is received via one of a medium access control (MAC) control element (CE), a downlink control information (DCI) transmission, or a radio resource control (RRC) transmission.

In a twelfth example, a base station having a transceiver configured to communicate with a user equipment and a processor communicatively coupled to the transceiver and configured to perform operations is provided. The operations include determining a measurement gap (MG) configuration for a user equipment (UE), the MG configuration comprising multiple MGs and MG conflict resolution information, wherein the MG conflict resolution information comprises information for the UE to resolve a conflict between two or more of the multiple MGs and transmitting the MG configuration to the UE.

In a thirteenth example, the base station of the twelfth example, wherein the conflict comprises one of (i) the two or more MGs partially or fully overlap, or (ii) a time period between the two or more MGs is less than a processing time period required to process measurements from one of the MGs.

In a fourteenth example, the base station of the twelfth example, wherein the multiple MGs are configured on a per UE basis.

In a fifteenth example, the base station of the twelfth example, wherein the multiple MGs are configured on a per frequency range (FR) basis for FRs with which the UE is configured.

In a sixteenth example, the base station of the twelfth example, wherein the MG conflict resolution information includes an indication of which of the multiple MGs is a default MG such that the UE is configured to prioritize the signal measurements of the default MG over those of other ones of the multiple MGs if the MG conflict is detected.

In a seventeenth example, the base station of the sixteenth example, wherein the default MG is indicated for each of multiple FRs with which the UE is configured.

In an eighteenth example, the base station of the sixteenth example, wherein the operations further comprise configuring an updated MG conflict resolution information comprising a change to the default MG.

In a nineteenth example, the base station of the eighteenth example, wherein the operations further comprise transmitting the updated MG conflict resolution information to the UE via one of a medium access control (MAC) control element (CE), a downlink control information (DCI) transmission, or a radio resource control (RRC) transmission.

In a twentieth example, the base station of the sixteenth example, wherein the MG conflict resolution information comprises a value for a timer and wherein the default MG is changed upon the expiration of the timer.

In a twenty first example, the base station of the sixteenth example, wherein determining the MG conflict resolution information is based on one of a resource signal type to be measured during each of the MGs, a length of each of the MGs, repetition period for each of the MGs, a UE capability or a UE type.

In a twenty second example, the base station of the twelfth example, wherein the MG conflict resolution includes multiple sharing factors (SFs) corresponding to the multiple MGs such that the UE is configured to prioritize the signal measurements of one of the multiple MGs over other ones of the multiple MGs based on the multiple SFs if the MG conflict is detected.

In a twenty third example, the base station of the twenty second example, wherein the multiple SFs are indicated for each of multiple FRs with which the UE is configured.

In a twenty fourth example, the base station of the twenty second example, wherein the operations further comprise transmitting a dynamic indication of different multiple SFs, wherein the dynamic indication is contained in one of a medium access control (MAC) control element (CE), a downlink control information (DCI) transmission, or a radio resource control (RRC) transmission.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above-described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
    receiving a measurement gap (MG) configuration, wherein the MG configuration includes multiple MGs and MG conflict resolution information;
    determining whether a conflict exists between two or more of the MGs;
    selecting at least one of the two or more MGs that have the conflict based on the MG conflict resolution information, wherein the MG conflict resolution information includes multiple sharing factors (SFs) corresponding to the two or more MGs such that the UE is configured to prioritize the signal measurements of one of the two or more MGs over other ones of the two or more MGs based on the multiple SFs if the MG conflict is detected; and
    performing signal measurements during the selected at least one of the two or more MGs that have the conflict.

2. The processor of claim 1, wherein the conflict comprises one of (i) the two or more MGs partially or fully overlap, or (ii) a time period between the two or more MGs is less than a processing time period required to process measurements from one of the MGs.

3. The processor of claim 1, wherein the multiple MGs are configured on a per frequency range (FR) basis for FRs with which the UE is configured.

4. The processor of claim 1, wherein the MG conflict resolution information includes an indication of which of the multiple MGs is a default MG, and wherein the selecting comprises selecting the default MG.

5. The processor of claim 4, wherein the default MG is indicated for each of multiple FRs with which the UE is configured.

6. The processor of claim 4, wherein the operations further comprise:
    receiving updated MG conflict resolution information comprising a change to the default MG, wherein selecting the at least one of the two or more MGs that have the conflict is based on the updated MG conflict resolution information.

7. The processor of claim 6, wherein the updated MG conflict resolution information is received via one of a medium access control (MAC) control element (CE), a downlink control information (DCI) transmission, or a radio resource control (RRC) transmission.

8. The processor of claim 4, wherein the operations further comprise:
    executing a timer;
    when the timer expires, updating the default MG from a first one of the multiple MGs to a second one of the multiple MGs, wherein a period for the timer is one of (i) signaled to the UE as part of the MG conflict resolution information or (ii) defined by standard.

9. The processor of claim 1, wherein the multiple SFs are indicated for each of multiple FRs with which the UE is configured.

10. The processor of claim 1, wherein the operations further comprise:
   receiving updated MG conflict resolution information comprising a change to at least one of the SFs, wherein the updated MG conflict resolution information is received via one of a medium access control (MAC) control element (CE), a downlink control information (DCI) transmission, or a radio resource control (RRC) transmission.

11. A processor of a base station configured to perform operations comprising:
   determining a measurement gap (MG) configuration for a user equipment (UE), the MG configuration comprising multiple MGs and MG conflict resolution information, wherein the MG conflict resolution information comprises information for the UE to resolve a conflict between two or more of the multiple MGs including multiple sharing factors (SFs) corresponding to the multiple MGs such that the UE is configured to prioritize the signal measurements of one of the multiple MGs over other ones of the multiple MGs based on the multiple SFs if the MG conflict is detected; and
   transmitting the MG configuration to the UE.

12. The processor of claim 11, wherein the conflict comprises one of (i) the two or more MGs partially or fully overlap, or (ii) a time period between the two or more MGs is less than a processing time period required to process measurements from one of the MGs.

13. The processor of claim 11, wherein the multiple MGs are configured on a per UE basis.

14. The processor of claim 11, wherein the multiple MGs are configured on a per frequency range (FR) basis for FRs with which the UE is configured.

15. The processor of claim 11, wherein the MG conflict resolution information includes an indication of which of the multiple MGs is a default MG such that the UE is configured to prioritize the signal measurements of the default MG over those of other ones of the multiple MGs if the MG conflict is detected.

16. The processor of claim 15, wherein the default MG is indicated for each of multiple FRs with which the UE is configured.

17. The processor of claim 15, wherein the MG conflict resolution information comprises a value for a timer and wherein the default MG is changed upon the expiration of the timer.

18. The processor of claim 15, wherein determining the MG conflict resolution information is based on one of a resource signal type to be measured during each of the MGs, a length of each of the MGs, repetition period for each of the MGs, a UE capability or a UE type.

* * * * *